May 5, 1959
M. J. ZUNICK ET AL
2,885,583
ROTATING STRUCTURE
Filed Oct. 12, 1954
2 Sheets-Sheet 1
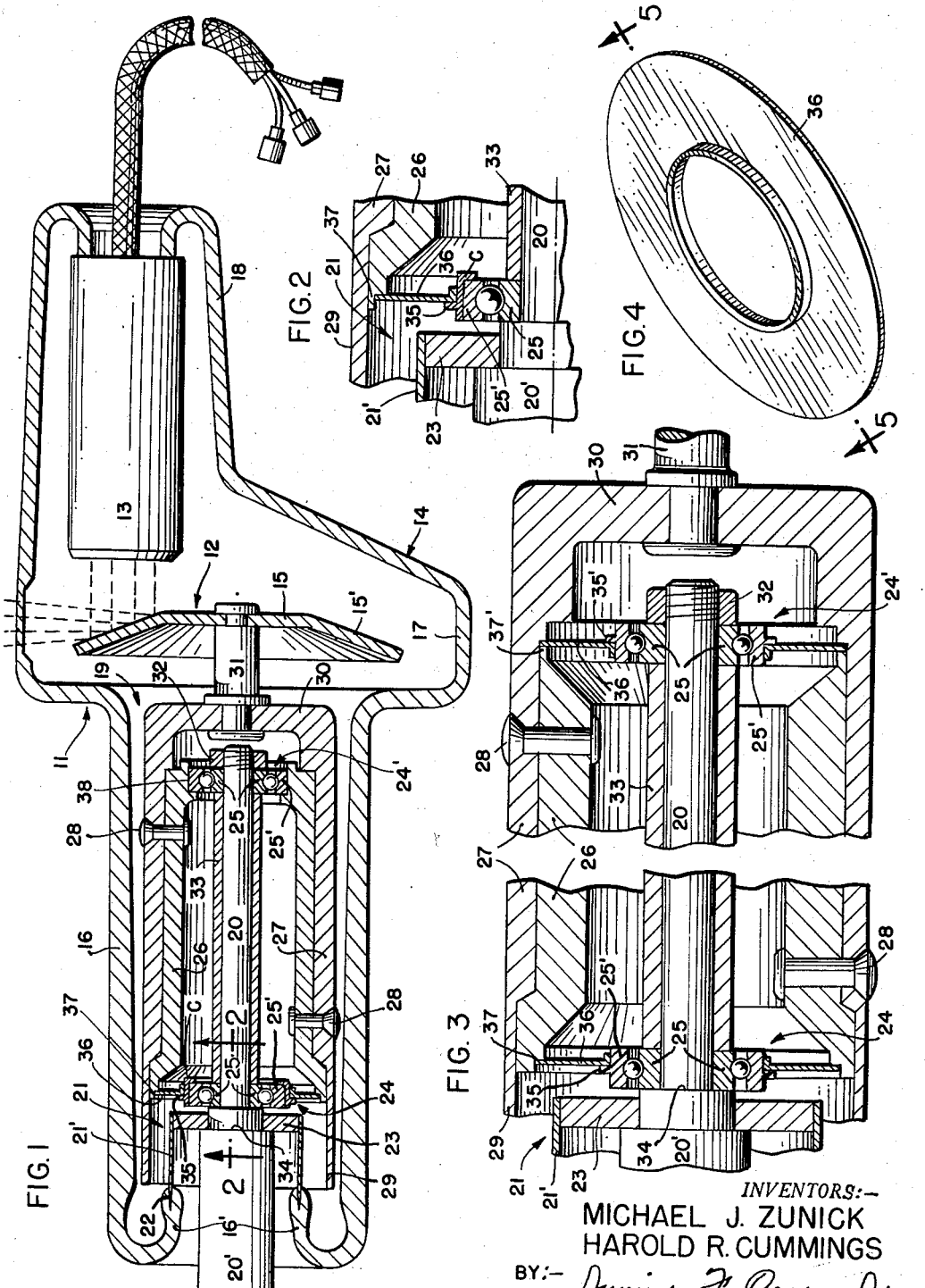
INVENTORS:—
MICHAEL J. ZUNICK
HAROLD R. CUMMINGS
BY:— Junius F. Cook, Jr.
ATTORNEY May 5, 1959 M. J. ZUNICK ET AL 2,885,583
ROTATING STRUCTURE
Filed Oct. 12, 1954 2 Sheets-Sheet 2

INVENTORS:—
MICHAEL J. ZUNICK
HAROLD R. CUMMINGS
BY:— *Junius F. Cook, Jr.*
ATTORNEY

United States Patent Office 2,885,583
Patented May 5, 1959

2,885,583
ROTATING STRUCTURE

Michael J. Zunick, Greenfield, and Harold R. Cummings, Waterford, Wis., assignors to General Electric Company, a corporation of New York Application October 12, 1954, Serial No. 461,766

16 Claims. (Cl. 313—60)

The present invention relates in general to bearings, and has more particular reference to bearing structures for supporting rotatable devices for operation under service conditions substantially inhibiting conventional lubrication of the bearing structure, the invention specifically contemplating an improved structure for turnably supporting the anode of an X-ray generating tube under the high temperature and low pressure conditions which prevail within the envelope of the tube.

In structure embodying roller bearings having race supported roller elements, such as spherical balls, the differential expansion of bearing parts, when required to operate under widely fluctuating temperature conditions, requires that the structure incorporate a certain amount of looseness in order to obviate binding or freezing of the bearing components. Such bearing looseness may result in a relatively high noise level of variably fluctuating, and consequently somewhat unpleasant, character. While noise at a constant level, in itself, may not be particularly displeasing or aggravating to an auditor, the noise effect commonly known as "galloping" noise, which is caused by relatively slow axial oscillation of the rotating parts due to bearing end play permitted by bearing looseness, frequently proves to be a source of annoyance to those who hear it.

As indicated, for example, in U.S. Letters Patent No. 2,230,857, issued February 4, 1941, on the invention of Zed J. Atlee relating to Bearings for rotating anode X-ray generating tubes, it has heretofore been conventional to employ helical spring means in conjunction with roller bearings to yieldingly take up bearing play or looseness, to thereby minimize bearing noise which otherwise might be produced in a bearing incorporating inherent looseness when the same is in operation. In such bearing structures, helical springs have been applied to yieldingly thrust a race element of a roller bearing axially in such a direction with respect to a cooperating bearing race element as to tend to restrict the movement of the roller elements of the bearing in a common annular path in order, normally, to produce relatively uniform bearing noise.

The spring pressed race element in such structures is usually mounted for sliding movement on a supporting member, such as a supporting stem or shaft, where the race element comprises the inner race of a bearing, or within a supported rim or sleeve, if the movable element be the outer race element of the bearing. The movable spring pressed race element in such structures of necessity must closely fit the member on which it is movably supported, in order to prevent excessive radial movement in the turnable structure. As a consequence, friction tends to resist movement of the movable race element and thus to prevent it from following the rapid action of roller balls moving at high speed. Since it is substantially impossible to adequately lubricate bearing surfaces under the extremely high operating temperatures and low pressures to which they are exposed in service in X-ray generating tubes, the same readily become galled, chafed, roughened or otherwise deteriorated as a consequence of sluggish spring pressed race movement.

An important object of the present invention is to provide a bearing structure for operation, substantially without deterioration through galling, binding or freezing, under service conditions including wide temperature fluctuations to which the structure is exposed; a further object being to provide novel yielding means in the structure allowing for expansion and contraction of its operating parts, under the influence of wide temperature variations, without freezing, galling or otherwise materially impairing the operating accuracy of the structure as a support.

Another important object is to employ a resilient metal diaphragm or disk spring for yieldingly supporting a roller bearing component; a further object being to utilize a disk spring made of tungsten, tantalum, molybdenum, or other metal capable of retaining its resilience at temperatures of the order encountered in the anode supporting structures of X-ray generating tubes.

Another important object is to provide a bearing structure of the character mentioned comprising at least a pair of spaced apart bearing structures for turnably mounting a sleeve upon a central axle stem or spindle, and wherein each of the bearing structures includes inner and outer race components, and wherein at least one of the race components of each bearing is resiliently mounted upon a disk spring support.

Another important object is to provide a rotating anode structure for X-ray generating tubes wherein the anode structure includes a roller bearing having a resiliently mounted race component secured on a flexible diaphragm or disk spring suspension element.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 1 is a sectional view through an X-ray generating tube having a rotating anode supported upon a bearing structure embodying the present invention;

Fig. 2 is a sectional view taken substantially along the line 2—2 in Fig. 1;

Fig. 3 is an enlarged sectional view taken longitudinally through a modified bearing structure embodying the invention;

Fig. 4 is a perspective view of a disk spring component;

Figure 5:
Fig. 5 is a sectional view taken along the line 5—5 in Fig. 4.

To illustrate the invention the drawings show an electron flow device comprising an X-ray generating tube 11 embodying anode and cathode structures 12 and 13 mounted in spaced apart relationship, in position to cause the anode to function as a source of X-rays in response to impingement thereon of electrons emitted by the cathode structure. The anode and cathode structures are supported on and enclosed by a sealed and evacuated envelope 14, which may conveniently comprise glass, the anode structure providing a rotating electron target member 15 forming a target 15' of ring-like configuration and disposed in position to receive electrons emitted by the cathode structure.

It should be understood that electron flow devices operate to cause electron flow between the emission means, embodied in the cathode structure, and the electron receiving target of the anode structure, such electron flow being ordinarily caused by energizing or exciting the emission means for the production of electrons, as by electrically energizing the emission means from a source of electrical energizing power disposed outwardly of the enclosing envelope, and by driving the so emitted electrons from the emission means to the target portion of the anode structure, as by applying an electron driving electrical potential between the emission and target means from a power source outwardly of the enclosing envelope.

X-ray generating tubes operate for the production of X-rays in response to the impingement at high velocity on the target means of electrons produced by the excitation of the cathodic emission means. X-rays thus generated at the target means may be directed thence as a useful beam projected outwardly of the enclosing envelope. Such high speed electronic impingement upon the target means results in the generation of relatively large quantities of heat therein, such heat being dissipated through and outwardly of the enclosing envelope. When in operation, the temperature of the target portion of the anode structure may be of the order of 2500° C., it being usual, in the interests of efficiency, to operate the generator so that the anode target at the area of electron impact functions at a temperature just short of the vaporizing temperature of the constituent material of the target.

As shown, the envelope 14 may comprise a sleeve-like, preferably cylindrical section 16 sized to relatively closely enclose the anode structure 12 at one end of the envelope, a medial envelope section 17 of hollow, preferably cylindrical configuration joined integrally with the sleeve portion 16 at one end thereof, said medial portion having substantially greater sectional size than the portion 16 and being coaxial therewith, and a sleeve-like, generally cylindrical envelope section 18, sized to relatively snugly enclose the cathode structure 13, the section 18 being integrally joined and connected with the medial section 17, at the end thereof remote from the section 16, said section 18 having its longitudinal axis eccentrically offset with respect to the common central axis of the sections 16 and 17, whereby to dispose the cathode structure in alinement with the electron target 15' on one side of the member 15.

The anode structure 12 provides support means 19 for turnably mounting the target member 15 in the envelope, said support means being disposed within the envelope section 16 and mounted at one end upon a re-entrant portion 16' of said section. The support means may extend at its opposite end substantially at the junction of the envelope sections 16 and 17, whereby the target member 15 may be mounted upon the support means 19 and carried thereby in position extending within the medial envelope section 17, said target member preferably comprising a disk having peripheral portions carrying the ring-like electron target 15' in position for rotary movement about the central axis of the envelope sections 16 and 17, thereby traveling the ring-like target continuously in alinement with the axis of the offset envelope section 18 in which the cathode 13 is disposed.

The support means 19 preferably comprises a central axle stem or spindle 20 of metal, such as steel, sealingly secured as by welding the same upon preferably cup-shaped metal mounting and sealing means 21, whereby the stem is secured upon the re-entrant envelope portion 16' in position extending in coaxial alinement with respect to the axis of the envelope sections 16 and 17. As shown, the mounting means 21 may conveniently comprise a cylindrical metal shell 21' having a circular edge making a glass-to-metal seal 22 with the inner end of the re-entrant envelope portion 16', the opposite end of the shell 21' being sealed, as by brazing the same, to the peripheral edges of a mounting disk 23. The disk 23 may be formed with a central opening through which the stem 20 may extend, the stem and disk being sealingly secured, as by brazing the same together around the edges defining the central opening of the disk. The stem 20 thus has an extension 20' extending within the re-entrant envelope portion 16' and hence exposed outwardly of the envelope, the remaining portions of the stem 20 extending within the envelope section 16.

The stem 20, within the envelope section 16, carries suitable bearing means for turnably supporting the target member 15, said bearing means preferably comprising roller bearings 24 and 24' each embodying an inner race 25 secured on the stem 20, an outer race 25', and a plurality of spherical balls forming roller elements between said races. Means may be provided for securing the inner race components 25 in spaced relation on the stem 20, and for mounting a sleeve-like support member 26, of metal such as steel, upon the outer race components 25' in order to support the member 26 turnably on the stem or spindle 20.

Means may also be provided for mounting the target member 15 upon the support member 26 in coaxial alinement with the stem 20. To this end, a sleeve-like mounting frame 27, of material such as copper, may be applied to the member 26 in position snugly embracing and surrounding the same and firmly secured thereto, as by rivets 28 or other suitable fastening means. The mounting frame 27 may include portions projecting outwardly of the opposite ends of the support member 26 to provide a skirt 29 in position surrounding and enclosing the mounting means 21 and its glass-to-metal seal with the re-entrant envelope portion 16', at one end of the support member 26. The end of the frame 27, remote from the skirt 29, may be formed with an end closure 30 carrying a stub shaft 31 having an end extending through a central opening formed in the target member 15.

The target member 15 may have any suitable form or construction and may comprise any preferred target material. As shown, the member 15 may comprise a rearwardly dished disk of tungsten formed with a central opening for snugly receiving the end of the stub shaft 31, which may be riveted or peened over upon the front face of the disk to hold the same securely on the stub shaft.

Since it is desirable to operate the generator in fashion producing temperatures of the order of 2500° C. at the target face, it is necessary that the target member be rotated at high speed in order to minimize the danger of overheating the target itself at the point of electron impact. Considerable difficulty has been encountered in providing suitable bearing structures for supporting anodes for rotation in X-ray generators. For optimum performance it is desirable to provide for maintaining the anode structure at all times in precise alinement, while permitting rotation of the anode substantially without vibration throughout extended service periods. Conventional bearings, however, deteriorate rapidly under the temperature and pressure conditions which prevail within the evacuated envelopes of X-ray generating tubes, such conditions substantially inhibiting the use of conventional lubricant in the bearings.

The present invention contemplates bearings adapted for long service life under the rigorous conditions mentioned. In that connection, diaphragm or disk spring means is employed to support and bias a bearing race axially in such a way as to tend to restrict the movement of the roller elements or balls of the bearing in a single annular path, while at the same time allowing movement of the spring pressed race whenever the forces of differential expansion due to temperature variations exceed that of the disk spring element. The spring element may be applied either to an inner or to an outer race component in order to apply resilient bias to the component to which the disk spring element is attached.

Disk springs also may be incorporated in both of a pair of spaced bearing units 24 and 24' or in either one of said units.

As shown in Figs. 1, 2 and 3, the inner race components 25 may be firmly secured on the spindle or stem 20 by means of a clamping nut 32 formed for threaded engagement with the inwardly projecting threaded end of the stem 20, a clamping sleeve 33 and a clamping shoulder 34 formed on the stem 20 remote from the threaded end thereof, said shoulder, in the illustrated embodiments, being formed on the stem 20 immediately adjacent and inwardly of the seal means 21. Accordingly, the inner race of the bearing unit 24 may be firmly clamped against the shoulder 34 by the spacing sleeve 33, which in turn may be held in position by the inner race of the bearing unit 24', said inner race being clamped against the end of the sleeve 33 by means of the nut 32.

As shown in Figs. 1, 2 and 3, the outer race of the bearing unit 24 may be provided with means forming a peripheral shoulder 35 thereon. This shoulder may either be formed in a retaining collar C sized for press fitted assembly upon the outer race component of the bearing unit, as shown in Figs. 1 and 2, or the shoulder 35 may be formed on and as an integral part of the outer race component, as shown in Fig. 3. In either event, the shoulder 35 may provide a seat for receiving and supporting the inner, preferably flanged edge of a disk spring member 36, the outer edge of which engages a seat 37 formed in one end of the support member 26. The inner edge of the disk spring may be brazed or otherwise secured in the seat formed by the shoulder 35, and the outer edge of the disk spring may be brazingly secured in the seat 27. The opposite end of the support member 26, as shown more particularly in Fig. 1, may be formed with a seat 38 for receiving and supporting the outer race component 25' of the bearing unit 24. It should be noted that the seats 37 and 38 face mutually outwardly at the opposite ends of the member 26. The spacing sleeve 33 also is sized so that when the clamping nut 32 is in tight clamping position, the disk spring 36 will be resiliently flexed in a direction to yieldingly urge the outer race components 25' of the bearing units 24 and 24' mutually in opposite directions, each with respect to its associated inner race element 25. The disk spring will thus urge the outer race of the bearing unit 24, with respect to the inner race 25 of said unit, in a direction toward the seal means 21; and, through the member 26, the disk spring 36 will also urge the outer race component of the bearing 24', with respect to the inner race element thereof, in a direction toward the target carrying end of the structure.

It will be noted that there is no sliding engagement between the spring pressed bearing component and the structural element to which the component is connected, whereby to gall, prevent movement, or freeze the bearings. On the contrary, the spring connected component has a free floating relationship with respect to the element of the structure with which it is connected by means of the spring. The floating race is thus mounted on the diaphragm or disk spring, which is held in place against the shoulder 35 and the seat 37 by action of the clamping nut 32. Any desired tension may be placed upon the disk spring 36 by selecting the spacement of the seats 37 and 38 and the length of the spacing sleeve 33.

As shown more particularly in Fig. 3 of the drawings, the outer race of the bearing unit 24' may also be provided with a peripheral seat 35' for receiving the inner, preferably flanged edge of a disk spring 36 having a marginal edge adapted to engage a seat 37' formed in the support member 26 at the end thereof remote from the seat 37. The seats 37 and 37' face mutually outwardly in opposite directions. The seats 35 and 35' face mutually inwardly. Accordingly, when the clamping nut 32 is secured in clamping position, the two biasing springs 36 will be oppositely stressed for the accomplishment of the objects of the present invention.

Figure 9:
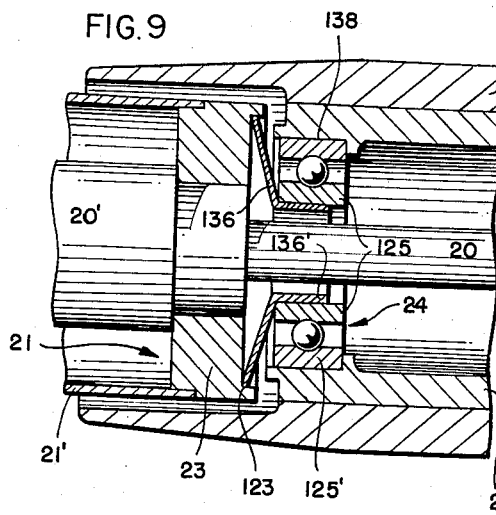
Figs. 9 and 10 are enlarged sectional views showing bearing structures embodying the invention.
Figure 10:
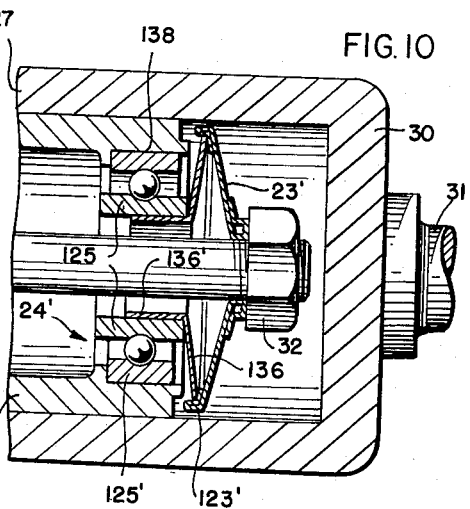

As shown more particularly in Figs. 9 and 10, the bearing units 24 and 24' may comprise outer bearing races 125' firmly secured in oppositely facing seats 138 at the opposite ends of the support member 26, and inner race elements 125 floatingly supported on the stem or spindle 20, as by means of flexible disk springs 136 generally similar to the springs 36. As shown, the springs 136 may be formed each with a central collar 136' adapted to supportingly engage an inner race element 125 to mount the same concentrically with respect to the stem or spindle 20. To this end, the collars 136' may be sized to snugly fit within the inner bearing race elements 125 in which the collars, if desired, may be secured, as by brazing. The outer or peripheral edge of the disk spring 136, which is associated with the bearing 24, may extend within and bearingly engage an annular seat 123 concentric with respect to the spindle 20. Said seat may conveniently be formed in the disk portion 23 of the sealing means 21, said disk portion being secured on the spindle 20. The disk spring 136 of the bearing unit 24 thus floatingly supports the inner race element of said unit on and in concentric relationship with respect to the spindle.

The inner race element of the bearing unit 24' likewise may be supported floatingly on and in concentric alinement with respect to the spindle 20 by means of its associated disk spring 136, the peripheral edge of which may be received in a seat 123' formed in a mounting member 23'. The mounting member may conveniently comprise sheet metal and may be formed with a central hub defining an opening for snugly receiving the inner threaded end of the spindle 20, whereby said mounting member 23' may be secured upon the spindle by means of the holding nut 32. The disk springs 136 may be tensioned to any desired extent by adjusting the nut 32. It will be obvious, of course, that either one of the inner races 125 may be secured rigidly upon the spindle 20 so long as the other is floatingly supported by means of a disk spring 136. It will also be obvious that the outer race element of one bearing unit may be connected with the member 26 by means of a spring 36 while the inner race element of the other bearing unit is mounted on the spindle 20 by means of a spring 136.

The disk spring means of the present invention may be made of any material, such as tungsten, molybdenum, tantalum and the like, which are capable of retaining resilience at high temperatures. A material particularly suited for the purpose is an alloy of tungsten with tantalum, comprising substantially 92.5% by weight of tantalum and 7.5% of tungsten. This alloy is capable of retaining its physical properties under the high temperature, low vacuum conditions encountered in X-ray generating tubes.

Figure 6:
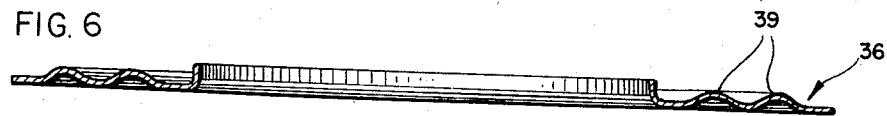
Fig. 6 is a sectional view, similar to Fig. 5, showing a modified form of disk spring embodying the invention.
Figure 7:
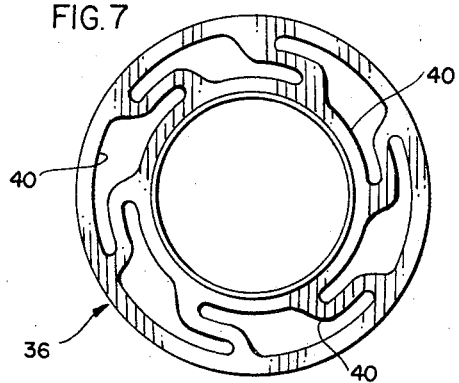
Figs. 7 and 8 are plan views of modified disk springs embodying the invention.
Figure 8:
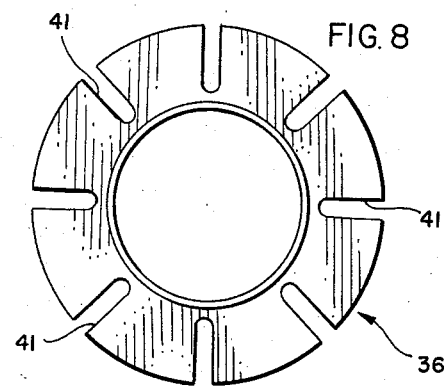

The present invention also contemplates the provision of optimum response characteristics in the disk spring by forming the same with circular flutes 39, as shown in Fig. 6, or by providing holes 40, edge opening slots 41 or other perforations or openings in the disk, as shown in Figs. 7 and 8, for improving the flexiblity and resilience characteristics of the element.

The constructions herein illustrated and described afford adequate support for the anodes of X-ray generating tubes when rotating at high speeds; and the disclosed structures are adapted to support rotating anodes substantially without vibration regardless of the range of temperature to which the parts are exposed.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of of its attendant advantages, the forms herein disclosed being preferred embodiments for the purpose of illustrating the invention.

The invention is hereby claimed as follows:

1. A bearing structure comprising a spindle element, a sleeve element, a pair of spaced bearings for turnably connecting said sleeve and spindle elements, said bearings each embodying roller members and cooperating inner and outer bearing races respectively connected to and associated with said spindle and sleeve elements, and disk springs respectively supporting corresponding races of each of said bearings resiliently in spaced relation on one of said elements, and means to secure the other races of said bearings in predetermined axially spaced relation on the other of said elements, to thereby oppositely tension said disk springs and resiliently urge corresponding races of each bearing axially in opposite directions each with respect to its cooperating race.

2. A bearing structure as set forth in claim 1, wherein a said disk spring comprises a highly flexible, circularly corrugated disk.

3. A bearing structure as set forth in claim 1, wherein a said disk spring is formed with circularly spaced apart openings therein.

4. A bearing structure as set forth in claim 1, wherein a said disk spring is formed with substantially radial slots.

5. A bearing structure as set forth in claim 1, wherein a said disk spring is formed with circularly spaced apart slots opening at the marginal edge thereof.

6. A bearing structure as set forth in claim 1, wherein a said disk spring is formed with openings elongated in a direction substantially parallel with the marginal edge thereof, each of said openings having an end extending in the spring radially inwardly of an end of the next adjacent opening.

7. A bearing structure comprising a spindle element, a sleeve element, a pair of spaced bearings for turnably connecting said sleeve and spindle elements, said bearings each embodying roller members and cooperating inner and outer bearing races respectively connected to and associated with said spindle and sleeve elements, and disk springs respectively interconnecting said inner races in space relation on said spindle element, said outer races being secured on said sleeve element in such spaced relation as to maintain said springs in stressed condition, to thereby resiliently urge inner races of each bearing axially in opposite directions each with respect to its outer race.

8. An X-ray generator comprising a sealed envelope, a spindle element extending and supported in said envelope, an anode element, a pair of spaced bearings turnably supporting the anode element on the spindle element, said bearings each embodying roller members and cooperating inner and outer bearing races respectively connected to and associated with said spindle and anode elements, disk springs respectively interconnecting corresponding races of each of said bearings in spaced relation on one of said elements, and means to secure the cooperating races of said bearings in predetermined axially spaced relation on the other of said elements, to thereby oppositely tension said springs and thus resiliently urge corresponding races of each bearing axially in opposite directions each with respect to its cooperating race.

9. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, disk springs having inner and outer edges and seated, each at its outer edge, in a corresponding one of said seats, and secured, each at its inner edge, to the outer race of a corresponding one of said bearings, and means to fasten the inner races of said bearings in spaced relation on said spindle such as to resiliently stress said springs mutually in opposite directions.

10. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, a highly flexible, circularly corrugated disk spring having inner and outer edges and seated, at its outer edge, in one of said seats, the inner edge of said disk being secured to the outer race of one of said bearings, the outer race of the other of said bearings being supported on the other of said seats, and means to fasten the inner races of said bearings in spaced relation on said spindle such as to resiliently stress said spring.

11. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, a disk spring having inner and outer edges and seated, at its outer edge, in one of said seats, the inner edge of said disk being secured to the outer race of one of said bearings, the outer race of the other of said bearings being supported on the other of said seats, and means to fasten the inner races of said bearings in spaced relation on said spindle such as to resiliently stress said spring, said disk spring having circularly spaced openings therein.

12. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, a disk spring having inner and outer edges and seated, at its outer edge, in one of said seats, the inner edge of said disk being secured to the outer race of one of said bearings, the outer race of the other of said bearings being supported on the other of said seats, and means to fasten the inner races of said bearings in spaced relation on said spindle such as to resiliently stress said spring, said spring having substantially radial slots formed therein.

13. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, a disk spring having inner and outer edges and seated, at its outer edge, in one of said seats, the inner edge of said disk being secured to the outer race of one of said bearings, the outer race of the other of said bearings being supported on the other of said seats, and means to fasten the inner races of said bearings in spaced relation on said spindle such as to resiliently stress said spring, said spring having circularly spaced slots formed therein and opening at the marginal edge thereof.

14. An X-ray generator comprising a sealed envelope, a spindle element extending and supported in said envelope, a sleeve forming an anode element, a pair of spaced bearings turnably supporting the anode element on the spindle element, said bearings each embodying roller members and cooperating inner and outer bearing races, said sleeve having a pair of spaced apart and mutually outwardly facing circular seats therein, a disk spring having inner and outer edges and seated, at its outer edge, in one of said seats, the inner edge of said disk being secured to the outer race of one of said bearings, the outer race of the other of said bearings being supported on the other of said seats, and means to fasten the inner races of said bearings in spaced relation on said spindle such as to resiliently stress said spring, said spring being formed with openings elongated in a direction substantially parallel with the marginal edge thereof, each of said openings having an end extending in the spring radially inwardly of an end of the next adjacent opening.

15. An X-ray generator comprising a sealed elvelope, a spindle element extending and supported in said envelope, an anode element, a pair of spaced bearings, each embodying roller members and cooperating inner and outer bearing races respectively connected to said spindle and anode elements, whereby to rotatably support the anode element on the spindle element, disk springs each respectively interconnecting the inner bearing races in spaced relation on said spindle, the outer races being secured on the anode element in such spaced relation as to maintain said springs in stressed condition to thereby resiliently urge corresponding races of each bearing axially in opposite directions each with respect to its cooperating race.

16. An X-ray generator comprising a sealed envelope, a spindle element extending and supported in said envelope, an anode element, bearing means embodying roller members and cooperating inner and outer bearing races respectively connected to said spindle and anode elements, whereby to rotatably support the anode element on the spindle element, and a disk spring interconnecting the inner bearing race with said spindle element.

References Cited in the file of this patent

UNITED STATES PATENTS

| | | |
|---|---|---|
| 1,800,564 | O'Connor | Apr. 14, 1931 |
| 2,335,224 | Atlee | Nov. 30, 1943 |
| 2,556,368 | Hegeman | June 12, 1951 |
| 2,718,945 | Turner et al. | Sept. 27, 1955 |
| 2,786,954 | Atlee | Mar. 26, 1957 |
| 2,813,210 | Zunick et al. | Nov. 12, 1957 |
| 2,831,995 | Agule | Apr. 22, 1958 |

FOREIGN PATENTS

| | | |
|---|---|---|
| 50,022 | Sweden | Oct. 14, 1918 |
| 215,470 | Switzerland | Nov. 1, 1941 |